US011032682B2

(12) United States Patent
Hwang et al.

(10) Patent No.: US 11,032,682 B2
(45) Date of Patent: Jun. 8, 2021

(54) METHOD AND APPARATUS FOR COMMUNICATION BETWEEN VEHICLES AND APPARATUS FOR USING THE SAME

(71) Applicant: Seoul National University R&DB Foundation, Seoul (KR)

(72) Inventors: SunWook Hwang, Gyeonggi-do (KR); Seongwon Kim, Seoul (KR); HoYoung Yoon, Seoul (KR); ByungJun Kim, Incheon (KR); SungHyun Choi, Seoul (KR); SaeWoong Bahk, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/686,519

(22) Filed: Nov. 18, 2019

(65) Prior Publication Data

US 2020/0186981 A1 Jun. 11, 2020

(30) Foreign Application Priority Data

Dec. 11, 2018 (KR) .................. 10-2018-0159276

(51) Int. Cl.
*H04W 4/46* (2018.01)
*H04W 8/00* (2009.01)
*H04W 88/04* (2009.01)

(52) U.S. Cl.
CPC ............. *H04W 4/46* (2018.02); *H04W 8/005* (2013.01); *H04W 88/04* (2013.01)

(58) Field of Classification Search
CPC ........ H04W 4/45; H04W 8/005; H04W 88/04
See application file for complete search history.

(56) References Cited

U.S. PATENT DOCUMENTS

| 2006/0248222 | A1* | 11/2006 | Saito ................... H04L 67/12 709/238 |
| 2013/0279392 | A1* | 10/2013 | Rubin ................... H04L 67/12 370/312 |
| 2016/0295589 | A1* | 10/2016 | Nikopour ............. H04W 4/023 |
| 2017/0132922 | A1* | 5/2017 | Gupta ................... G06F 3/0482 |
| 2019/0004179 | A1* | 1/2019 | Hwang ................. H04W 64/00 |
| 2019/0088041 | A1* | 3/2019 | Lee ..................... H04W 4/12 |
| 2019/0197898 | A1* | 6/2019 | Espinosa Cardenas ................... G08G 1/146 |
| 2019/0303693 | A1* | 10/2019 | Watanabe ............ G05D 1/0276 |
| 2020/0027346 | A1* | 1/2020 | Lisewski ............. G08G 1/0112 |
| 2020/0186981 | A1* | 6/2020 | Hwang ................ H04W 4/46 |

FOREIGN PATENT DOCUMENTS

KR 10-2016-0144719 A 12/2016
KR 10-2018-0081047 A 7/2018

OTHER PUBLICATIONS

Office Action dated Mar. 11, 2019 in corresponding Korean Application No. 10-2018-0159276; 6 pages including Partial Machine-generated English-language translation.

* cited by examiner

*Primary Examiner* — Md K Talukder
(74) *Attorney, Agent, or Firm* — Maier & Maier, PLLC (57) ABSTRACT

An inter-vehicle communication method and an apparatus for performing the same. The inter-vehicle communication method may include a reception node receiving at least one vehicle-to-vehicle (V2V) message from at least one transmission node and the reception node transmitting a relay V2V message on the basis of the at least one V2V message, wherein the at least one V2V message may include information about adjacent vehicles discovered by the at least one transmission node.

8 Claims, 8 Drawing Sheets

FIG. 2

V2V MESSAGE (TYPE 1)(210)

V2V MESSAGE (TYPE 2)(220)

| | VID$_1$ | VID$_2$ | VID$_3$ | VID$_4$ | VID$_5$ |
|---|---|---|---|---|---|
| VID$_1$ | - | 1 | 0 | 0 | 1 |
| VID$_2$ | 1 | - | 1 | 1 | 0 |
| VID$_3$ | 0 | 1 | - | 0 | 0 |
| VID$_4$ | 0 | 1 | 0 | - | 1 |
| VID$_5$ | 1 | 0 | 0 | 1 | - |

Observation table of VID$_x$

1: Vehicles are in the target range

0: Vehicles are not in the target range

VID$_x$ (500)

RELAY V2V MESSAGE

FIG. 8

METHOD AND APPARATUS FOR COMMUNICATION BETWEEN VEHICLES AND APPARATUS FOR USING THE SAME

CROSS-REFERENCE TO RELATED APPLICATION

This application claims priority to and the benefit of Korean Patent Application No. 10-2018-0159276, filed on Dec. 11, 2018, the disclosure of which is incorporated herein by reference in its entirety.

FIELD

The present invention relates to an inter-vehicle communication method and an apparatus for performing the same method, and more particularly, to an inter-vehicle communication message relay and an inter-vehicle communication message format for effectively performing inter-vehicle communication.

BACKGROUND

This work was supported by the National Research Foundation of Korea (NRF) grant funded by the Ministry of Science of the Government of South Korea (MSIT) (No. 2020R1A2C2101815).

This work was supported by the Institute of Information & Communications Technology Planning & Evaluation (IITP) grant funded by the Ministry of Science of the Government of South Korea (MSIT) (No. 2018-0-00923, Scalable Spectrum Sharing for Beyond 5G Communication).

A vehicular network is one core network in an intelligent transportation system (ITS), and various services for safety services are being studied to prevent traffic accidents. The Institute of Electrical and Electronics Engineers (IEEE) has standardized IEEE802.11p WAVE, which is a wireless LAN standard, to support vehicle communications, and the Federal Communications Commission (FCC) has allocated a frequency band of 5.850-5.925 GHz for the purpose of vehicle communication. Unlike a conventional mobile ad-hoc network (MANET), advantageously, vehicle communication does not need to significantly consider battery efficiency and can obtain location information using a GPS device.

In such an inter-vehicle communication technology, each vehicle transmits a message (including information such as location information, acceleration, speed, etc.) in a broadcast manner at every interval (e.g., 100 ms). Through such a message, vehicles can check the conditions of adjacent vehicles. This technology is an underlying technology that can be utilized later when autonomous vehicles are widely used or when driving assistance technology is developed.

However, according to conventional inter-vehicle communication, when a message is transmitted in a broadcast manner, a vehicle-to-vehicle (V2V) message transmission vehicle cannot check whether a V2V message reception vehicle receives the message. Accordingly, a V2V message transmission vehicle cannot know which vehicle does not receive a V2V message, and also a V2V message reception vehicle cannot check what vehicular messages it has not received and thus cannot request retransmission of the vehicular messages. Therefore, there is a need for a method for solving the problems of the conventional inter-vehicle communication.

SUMMARY

The present invention is directed to solving the aforementioned problems.

Also, by solving the problem of a V2V message of a vehicle not being delivered to adjacent vehicles well, the problem being caused due to a decrease in reception rate of the V2V message caused by an non-line-of-sight (NLOS) environment, resource collision, channel performance degradation, and the like, it is possible to expand the range of the inter-vehicle communication and thus a vehicle can more accurately determine information about adjacent vehicles.

Also, according to the present invention, by decreasing unnecessary relay of a V2V message, it is possible to allow effective inter-vehicle communication.

Representative configurations of the present invention for achieving the objectives are as follows.

One aspect of the present invention provides an inter-vehicle communication method, the method comprising receiving, by a reception node, at least one vehicle-to-vehicle (V2V) message from at least one transmission node, transmitting, by the reception node, a relay V2V message on the basis of the at least one V2V message, wherein the at least one V2V message includes information about adjacent vehicles discovered by the at least one transmission node.

Also, the at least one V2V message is a V2V message (Type 1) or a V2V message (Type 2), the V2V message (Type 1) includes identification information about all the discovered adjacent vehicles, and the V2V message (Type 2) includes identification information about a vehicle among the discovered adjacent vehicles that changes.

Also, the V2V message (Type 1) is transmitted at first intervals, the V2V message (Type 2) is transmitted at second intervals, the first interval is longer than the second interval, and the V2V message (Type 2) is transmitted at least once within the transmission interval of the V2V message (Type 1).

Also, a relay V2V message includes a field that is the same as at least one of a plurality of fields included in the at least one V2V message and a relay flag, and the relay flag is a flag for identifying the relay V2V message.

Also, the reception node determines whether to transmit the relay V2V message on the basis of the at least one V2V message and another relay V2V message.

Another aspect of the present invention provides a reception node for inter-vehicle communication, the reception node comprising a radio frequency (RF) unit configured to communicate with a transmission node and a processor operatively connected to the RF unit, wherein the processor is implemented to receive at least one vehicle-to-vehicle (V2V) message from at least one transmission node and transmit a relay V2V message on the basis of the at least one V2V message, and the at least one V2V message includes information about adjacent vehicles discovered by the at least one transmission node.

Also, the at least one V2V message is a V2V message (Type 1) or a V2V message (Type 2), the V2V message (Type 1) includes identification information about all the discovered adjacent vehicles, and the V2V message (Type 2) includes identification information about a vehicle among the discovered adjacent vehicles that changes.

Also, the V2V message (Type 1) is transmitted at first intervals, the V2V message (Type 2) is transmitted at second intervals, the first interval is longer than the second interval, and the V2V message (Type 2) is transmitted at least once within the transmission interval of the V2V message (Type 1).

Also, a relay V2V message includes a field that is the same as at least one of a plurality of fields included in the at least one V2V message and a relay flag, and the relay flag is a flag for identifying the relay V2V message.

Also, the reception node determines whether to transmit the relay V2V message on the basis of the at least one V2V message and another relay V2V message.

According to the present invention, by solving the problem of a V2V message of a vehicle not being delivered to adjacent vehicles well, the problem being caused due to a decrease in reception rate of the V2V message caused by an non-line-of-sight (NLOS) environment, resource collision, channel performance degradation, and the like, it is possible to expand the range of the inter-vehicle communication and thus a vehicle can more accurately determine information about adjacent vehicles.

Also, according to the present invention, by decreasing unnecessary relay of a V2V message, it is possible to allow effective inter-vehicle communication.

DETAILED DESCRIPTION

In the following detailed description of the present inventive concept, references are made to the accompanying drawings that show, by way of illustration, specific embodiments in which the present inventive concept may be practiced. These embodiments are described in sufficient detail to enable those skilled in the art to practice the present inventive concept. It is to be understood that the various embodiments of the present inventive concept, although different from each other, are not necessarily mutually exclusive. For example, specific shapes, structures and characteristics described herein may be implemented as modified from one embodiment to another without departing from the spirit and scope of the present inventive concept. Furthermore, it shall be understood that the locations or arrangements of individual components within each embodiment may also be modified without departing from the spirit and scope of the present inventive concept. Therefore, the following detailed description is not to be taken in a limiting sense, and the scope of the present inventive concept is to be taken as encompassing the scope of the appended claims and all equivalents thereof. In the drawings, like reference numerals refer to the same or similar elements throughout the several views.

Hereinafter, preferred embodiments of the present inventive concept will be described in detail with reference to the accompanying drawings to enable those skilled in the art to easily implement the present inventive concept.

In a conventional inter-vehicle communication, each vehicle may transmit a vehicle-to-vehicle (V2V) message in a broadcast manner at certain intervals (e.g., 100 ms). A conventional V2V message may include vehicle state information such as vehicle location information, vehicle acceleration information, and vehicle speed information. A V2V message may be a cooperative awareness message (CAM). Through a V2V message, a vehicle may acquire information about the states of adjacent vehicles. A V2V message may be utilized as one piece of information for driving assistance technology and future autonomous driving technology. The term "V2V message" used herein will be used to cover a message for inter-vehicle communication.

At present, the reception rate of a V2V message is decreased due to a non-line-of-sight (NLOS) environment, resource collision, and channel performance degradation. Accordingly, due to these various causes, a V2V message of a vehicle may not be delivered to adjacent vehicles well. Hereinafter, a vehicle transmitting a V2V message is represented by the term "transmission vehicle," a vehicle receiving a V2V message is represented by the term "reception vehicle," and a vehicle relaying a V2V message is represented by the term "relay vehicle."

A conventional V2V message uses a broadcast-based transmission scheme, and thus a transmission vehicle does not check whether a reception vehicle receives a V2V message. In detail, according to broadcast-based inter-vehicle communication, each transmission vehicle just transmits a V2V message including vehicular information and does not check whether other vehicles receive the V2V message.

Accordingly, a transmission vehicle that has transmitted a V2V message cannot know which vehicle does not receive the V2V message, and also a reception vehicle that has received the V2V message cannot check what V2V messages it has not received and thus cannot request retransmission of the V2V messages that have not been received.

According to the inter-vehicle communication method according to an embodiment of the present invention, in order to solve the above problems due to the V2V message broadcast, identification information (IDs) of adjacent vehicles recognized within a target range by a vehicle may be included in a V2V message. In detail, a transmission vehicle may transmit a V2V message including identification information about adjacent vehicles recognized within a target range. A reception vehicle that has received the V2V message may check the adjacent vehicle identification information about the transmission vehicle included in the V2V message and may determine unrecognized adjacent vehicles that are within the target range of the transmission vehicle but have not been recognized by the transmission vehicle that has transmitted the V2V message. The reception vehicle may operate as a relay vehicle to relay (or deliver) a relay V2V message to the transmission vehicle.

According to the present invention, for convenience of description, it is assumed that an object that receives and relays a V2V message from a transmission vehicle is a vehicle, but the object that receives and relays a V2V message from a transmission vehicle may be an object (e.g.

a base station) other than the vehicle. Accordingly, a transmission vehicle may be represented by the term "transmission node," the reception vehicle may be represented by the term "reception node," and the relay vehicle may be represented by the term "relay node." In this case, node-based inter-vehicle communication is also within the scope of the present invention.

Figure 1:
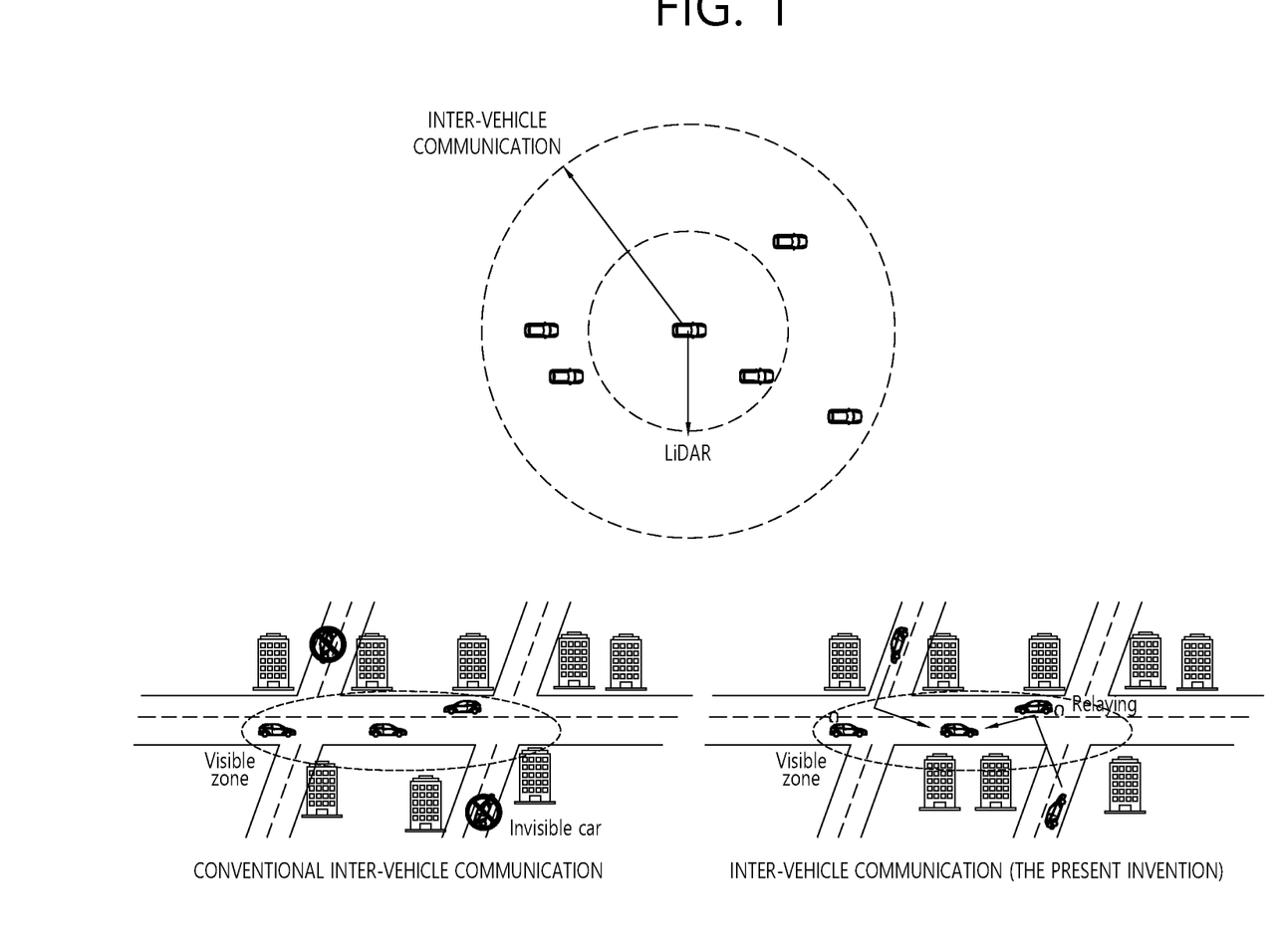
FIG. 1 is a conceptual diagram showing inter-vehicle communication according to an embodiment of the present invention.

FIG. 1 is a conceptual diagram showing inter-vehicle communication according to an embodiment of the present invention.

Referring to an upper portion of FIG. 1, inter-vehicle communication may have a relative wide transmission/reception region, compared to a sensing base radar, a light detection and ranging (LiDAR) or a camera that can be installed later in vehicles.

In particular, LiDAR, which will be installed in autonomous vehicles, has very limited coverage due to the influence of weather, a non-line-of-sight (NLOS) environment, and road surfaces. In addition, an object recognition range through a camera is relatively short compared to inter-vehicle communication. Accordingly, the inter-vehicle communication can expand a distance for determining a situation around a vehicle. A V2V message used for inter-vehicle communication may be transmitted at short intervals (e.g., 100 ms) because the location of a vehicle can be smoothly discovered at short intervals. However, the transmission or reception of V2V messages between vehicles may not be smooth depending on the conditions of the inter-vehicle communication, and this may prevent the vehicles from receiving vehicular messages within a target range including a really important location. However, according to the current inter-vehicle communication technology, it is not possible to determine whether a V2V message is received.

Therefore, it is necessary to determine whether a specific vehicle has received a V2V message from an adjacent vehicle within a target range in order to more accurately determine the location of the vehicle.

According to the inter-vehicle communication method according to an embodiment of the present invention, on the basis of information about adjacent vehicles included in a V2V message transmitted in a broadcast manner by a transmission vehicle, an unreceived V2V message, which has not been received by the transmission vehicle, may be determined and then relayed to the transmission vehicle.

Referring to a lower portion of FIG. 1, when the inter-vehicle communication method according to an embodiment of the present invention is used, it is possible to reduce the case where adjacent vehicles cannot be determined because a V2V message is not received (relayed) and also to determine information about the conditions of adjacent vehicles within a wider range. Accordingly, the inter-vehicle communication method according to an embodiment of the present invention may be utilized as an underlying technology that helps autonomous driving of vehicles to expand and improve conventional vehicle-vision-based autonomous driving technology. Also, when the inter-vehicle communication method according to an embodiment of the present invention is used, it is possible to stably determine the locations of adjacent vehicles and apply the locations to a vehicle-safety-associated application.

The inter-vehicle communication method according to an embodiment of the present invention will be disclosed in detail below.

Figure 2:
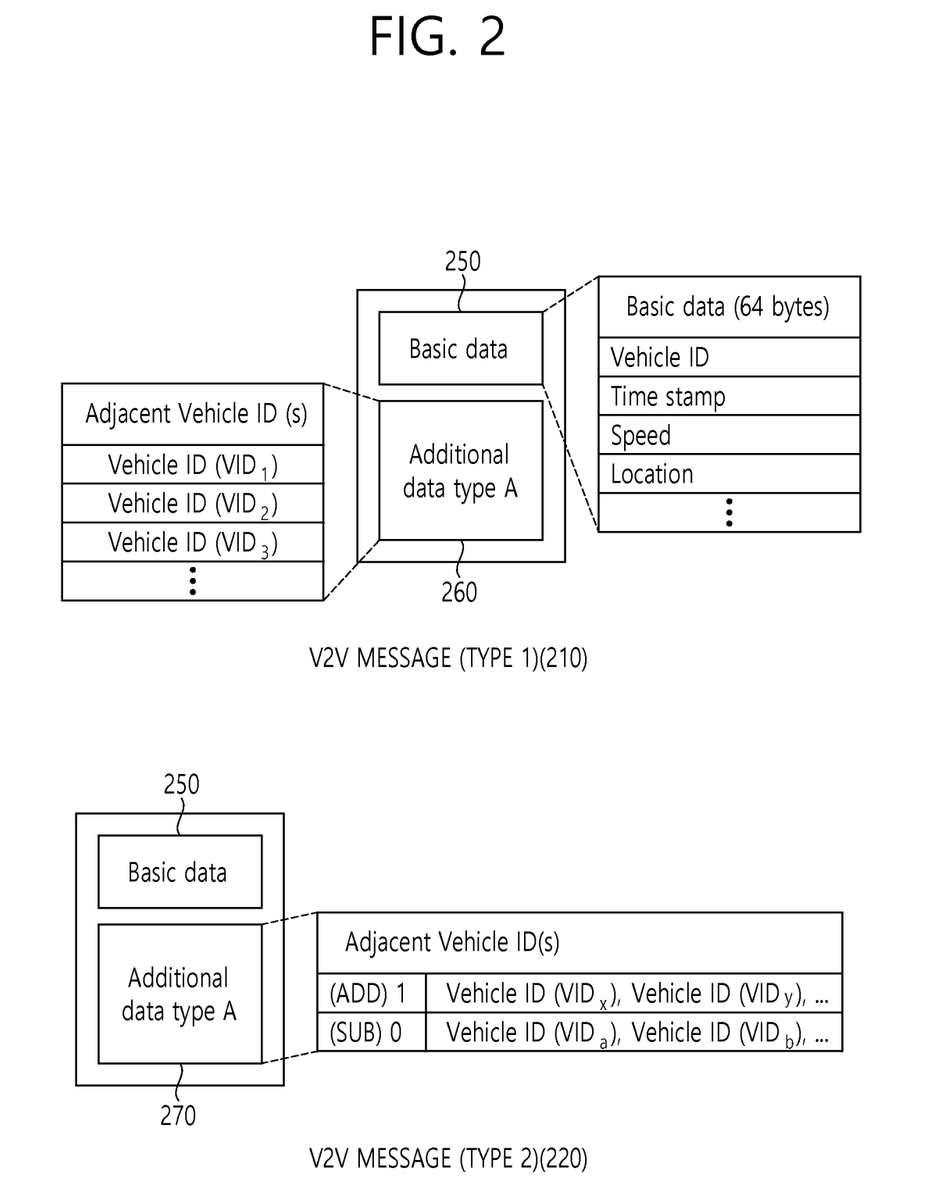
FIG. 2 is a conceptual diagram showing a V2V message for inter-vehicle communication according to an embodiment of the present invention.

FIG. 2 is a conceptual diagram showing a V2V message for inter-vehicle communication according to an embodiment of the present invention.

The V2V message for the inter-vehicle communication may include vehicle state information (e.g., the ID, speed, location, acceleration, and like of a vehicle).

A new V2V message format for solving the problems of the broadcast-based V2V message transmission scheme is disclosed in the inter-vehicle communication method according to an embodiment of the present invention. By relaying a V2V message of an adjacent vehicle located within a target range of a vehicle through the new V2V messages format, the V2V message can be received without being lost.

The 3rd Generation Partnership Project (3GPP), which is an international communication standards organization, has defined a target range in which a V2V message has to be received. V2V communication must be possible between vehicles located within the target range. The target range has been defined as a distance that can be reached in a threshold time (e.g., four seconds) on the basis of the relative speed of the vehicle. For example, the target range may be defined to be 150 m for a local road and 300 m for an expressway.

A reception vehicle located within a target range of a transmission vehicle has to receive a V2V message from the transmission vehicle at transmission intervals (e.g., 100 ms) for the V2V message.

According to the European Telecommunications Standards Institute (ETSI), the size of a V2V message is defined to be 300 bytes by default, and also it is defined that a vehicle should transmit a V2V message periodically (every 100 ms).

The V2V message may include information such as vehicle ID (4 bytes), a message creation time, a vehicle speed, a vehicle location, and states of other vehicles, The size of the basic data 250 is about 64 bytes, the remaining data space may be present in a message of 300 bytes.

In the inter-vehicle communication method according to the present invention, the V2V message may further include adjacent vehicle identifier (ID) information received within a target range of a vehicle. In the inter-vehicle communication method according to an embodiment of the present invention, the V2V message may be defied as two types, i.e., a V2V message (Type 1) and a V2V message (Type 2).

Referring to an upper portion of FIG. 2, the V2V message (Type 1) may further include adjacent vehicle identifier information within the target range therein. The V2V message (Type 1) may include adjacent vehicle identifier information (vehicle ID1($VID_1$), vehicle ID2($VID_2$), vehicle ID3($VID_3$), etc.) of adjacent vehicles within a target range of a vehicle in addition to the basic data 250.

A field of the V2V message (Type 1) that further includes adjacent vehicle identifier information within a target range may be represented by the term "default identifier information field 260."

Referring to a lower portion of FIG. 2, the V2V message (Type 2) may include information about adjacent vehicles that change with respect to adjacent vehicle information included in the V2V message (Type 1).

For example, information about an adjacent vehicle determined as newly entering the target range may be included in a part "ADD," and information about an adjacent vehicle determined as exiting the target range may be included in a part "SUB."

A field including information about an adjacent vehicle that enters or exits the target range included in the part "ADD" or the part "SUB" may be represented by the term "identifier change information field 270." In the identifier change information field, the part "ADD" may correspond to an identifier addition information field, and the part "SUB" may correspond to an identifier subtraction information field.

Figure 3:
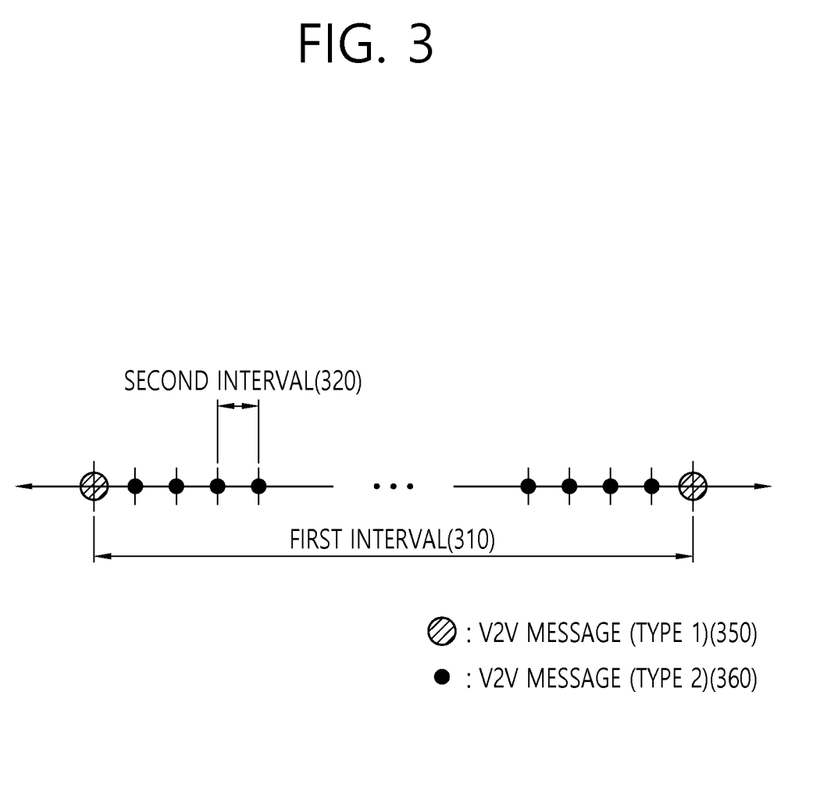
FIG. 3 is a conceptual diagram showing a V2V message transmission method according to an embodiment of the present invention.

FIG. 3 is a conceptual diagram showing a V2V message transmission method according to an embodiment of the present invention.

A method of transmitting a V2V message (Type 1) and a V2V message (Type 2) is disclosed in FIG. 3.

Referring to FIG. 3, in conventional V2V message transmission, V2V messages of the same format are transmitted every 100 ms. However, according to an embodiment of the present invention, a V2V message (Type 1) 350 is transmitted at first intervals 310, and a V2V message (Type 2) 360 is transmitted at second intervals 320, which are shorter than the first intervals 310 at which the V2V message (Type 1) 350 is transmitted. Each of the first intervals 310 may be longer than each of the second intervals 320.

In detail, after a first V2V message (Type 1) is transmitted, a plurality of V2V messages (Type 2) including information about adjacent vehicles that changes with respect to adjacent vehicle identifier information included in the first V2V message (Type 1) may be transmitted, and then a second V2V message (Type 1) may be transmitted.

With this method, it is possible to minimize unnecessary data transmission and also to efficiently update information about adjacent vehicles.

For example, when second to fifth vehicles are detected within a target range of a first vehicle, a default identifier information field of a V2V message (Type 1) 350 transmitted by the first vehicle may include identification information about the second to fifth vehicles. Subsequently, when within the target range of the first vehicle, the third vehicle is not discovered and a sixth vehicle is newly discovered, an identifier addition information field of an identifier change information field of the V2V message (Type 2) 360 transmitted by the first vehicle may include information about the sixth vehicle, and an identifier subtraction information field of the identifier change information field may include information about the third vehicle.

The transmission of the V2V message (Type 1) 350 and the V2V message (Type 2) 360 is merely one example. Therefore, only the V2V message (Type 1) 350 may be transmitted, and this embodiment is also within the scope of the present invention. That is, identification information about adjacent vehicles discovered with a target range may be transmitted in a default identifier information field every 100 ms without separate change information.

According to an embodiment of the present invention, the target range may be adjusted according to a vehicle location and a vehicle operating environment. For example, the target range may be adjusted in consideration of at least one of whether it is a local road or an expressway, road vehicle congestion, and a collision possibility. For example, a difference in relative speed between vehicles may increase in an expressway. When the difference in relative speed increases, it is necessary to determine adjacent vehicles within a wider range, and the target range may be set to be relatively wide.

Figure 4:
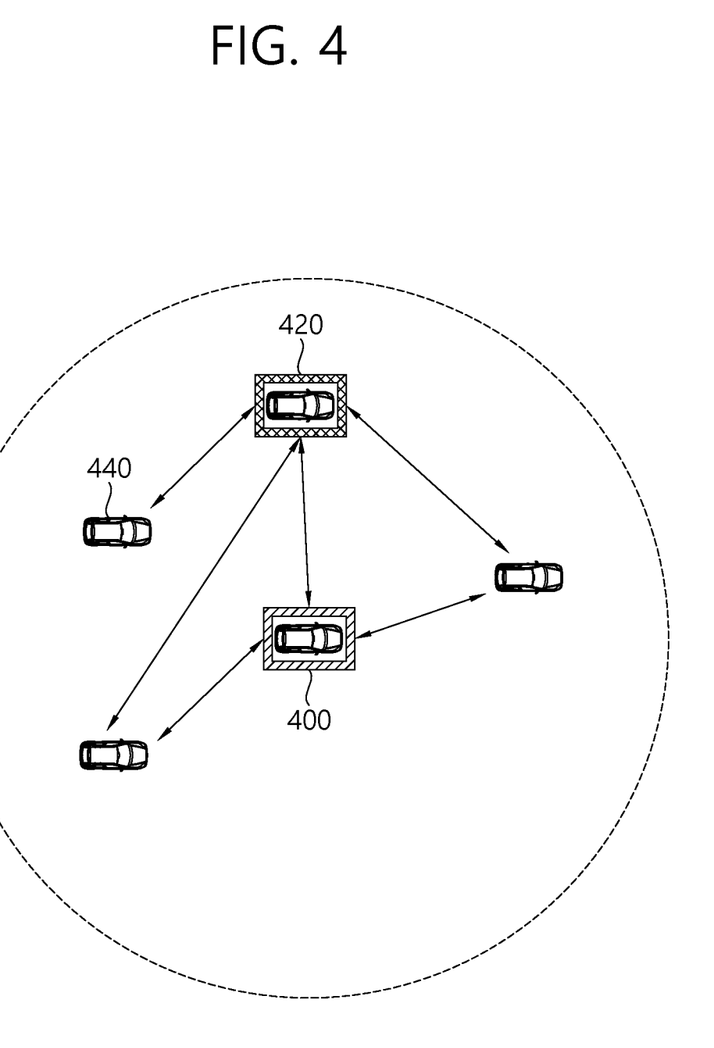
FIG. 4 is a conceptual diagram showing an inter-vehicle communication method according to an embodiment of the present invention.

FIG. 4 is a conceptual diagram showing an inter-vehicle communication method according to an embodiment of the present invention.

A method of determining information about adjacent vehicles through transmission of a V2V message and relaying a V2V message is disclosed in FIG. 4.

Referring to FIG. 4, a transmission vehicle 400 may transmit a V2V message (Type 1) and a V2V message (Type 2).

For example, the V2V message (Type 1) may be transmitted at first intervals (e.g., every one second), and the V2V message (Type 2) may be transmitted at second intervals (e.g., every 100 ms) which are shorter than the first intervals. In detail, a V2V message (Type 1) may be transmitted at a time point of 1 sec, a V2V message (Type 2) may be transmitted every 100 ms from 1 sec 100 ms to 1 sec 900 ms, and a V2V message (Type 1) may be transmitted again at a time point of 2 sec.

A reception vehicle 420 may determine vehicles adjacent to the transmission vehicle 400 discovered by the transmission vehicle 400 on the basis of the V2V message (Type 1) and the V2V message (Type 2). Also, the reception vehicle 420 may determine an adjacent communication failure vehicle 440 that is within a discovery range of the transmission vehicle 400 but is not discovered by the transmission vehicle 400 and then may operate as a relay vehicle to relay (or deliver) a relay V2V message, which is a V2V message of the adjacent communication failure vehicle 440, to the transmission vehicle 400.

For example, the reception vehicle 420 may create an observation table to determine the relay V2V message (or to determine an adjacent vehicle within a discovery range) and determine the adjacent communication failure vehicle (440) on the basis of the observation table.

According to an embodiment of the present invention, the transmission vehicle 400 may transmit only a V2V message (Type 1), and the reception vehicle 420 may receive the V2V message (Type 1), determine the adjacent communication failure vehicle 440, and operate as a relay vehicle to relay (or deliver) a V2V message of the adjacent communication failure vehicle 440 to the transmission vehicle 400 as a relay target V2V message.

Also, according to an embodiment of the present invention, the transmission interval of the V2V message (Type 1) may be adjusted. The transmission interval of the V2V message (Type 1) may be changed in consideration of a communication environment, a vehicle operating environment, a communication success rate of the V2V message, and the like. For example, when the communication success rate of the V2V message is relatively low, the transmission interval of the V2V message (Type 1) may be relatively short. With this method, it is possible to decrease the possibility of error in determining the location of an adjacent vehicle due to communication failure.

Figure 5:
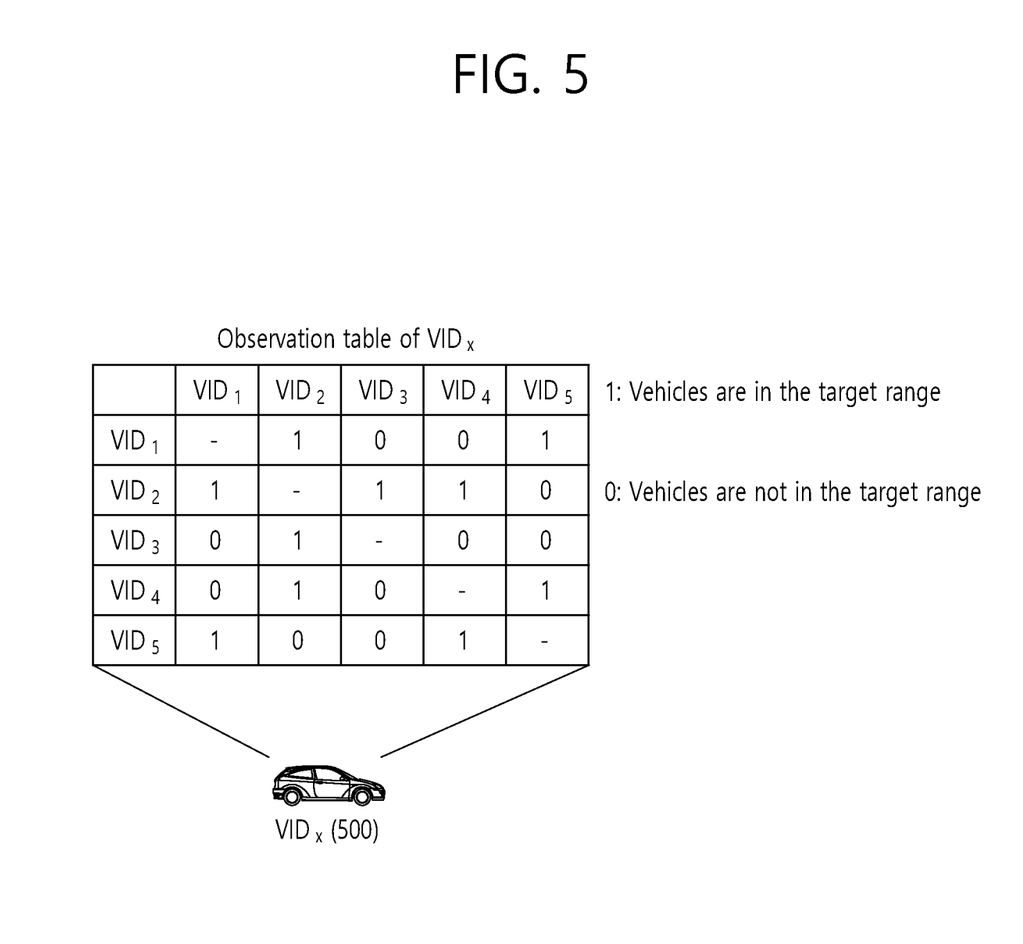
FIG. 5 is a conceptual diagram showing a V2V message relay method according to an embodiment of the present invention.

FIG. 5 is a conceptual diagram showing a V2V message relay method according to an embodiment of the present invention.

A method of determining an adjacent communication failure vehicle that is within a discovery range of a reception vehicle but is not discovered by a transmission vehicle and relaying (or delivering) a V2V message of the adjacent communication failure vehicle to the transmission vehicle as a relay V2V message is disclosed in FIG. 5.

Referring to FIG. 5, a reception vehicle $VID_X$ (500) may create an observation table on the basis of a V2V message. The reception vehicle $VID_x$ (500) may receive a V2V message from at least one of a transmission vehicle $VID_4$, a transmission vehicle $VID_2$, a transmission vehicle $VID_3$, a transmission vehicle $VID_4$, and a transmission vehicle $VID_5$ and create an observation table. The observation table is merely one example for determining whether a vehicle is located within a target range. The determination of whether a vehicle is located within a target range may be performed by various other methods.

In the observation table, the case where two vehicles are located within the target range is indicated as "1," and the case where two vehicles are located outside the target range is indicated as "0."

For example, on the basis of a V2V message $VID_1$ received from the transmission vehicle $VID_1$, the vehicle $VID_2$ and the vehicle $VID_5$ may be confirmed as being located within a target range of the transmission vehicle $VID_1$. Accordingly, $VID_2$ and $VID_5$ may be displayed as "1" in the observation table on the basis of $VID_1$.

Also, on the basis of a V2V message $VID_2$ received from the transmission vehicle $VID_2$, the vehicle $VID_3$ and the vehicle $VID_4$ may be confirmed as being located within a target range of the transmission vehicle $VID_2$. In this case, the vehicle $VID_1$ is not directly confirmed as being located within the target range of the vehicle $VID_2$ on the basis of the V2V message $VID_2$ received from the transmission vehicle $VID_2$. However, $VID_1$ as well as $VID_3$ and $VID_4$ may be displayed as "1" in the observation table because the vehicle $VID_2$ is confirmed as being located within the target range of the transmission vehicle $VID_1$ on the basis of the V2V message $VID_1$ received from the transmission vehicle $VID_1$.

An observation table may be created in this way, and a V2V message may be relayed to a vehicle that is within a target range but has not received the V2V message.

Figure 6:
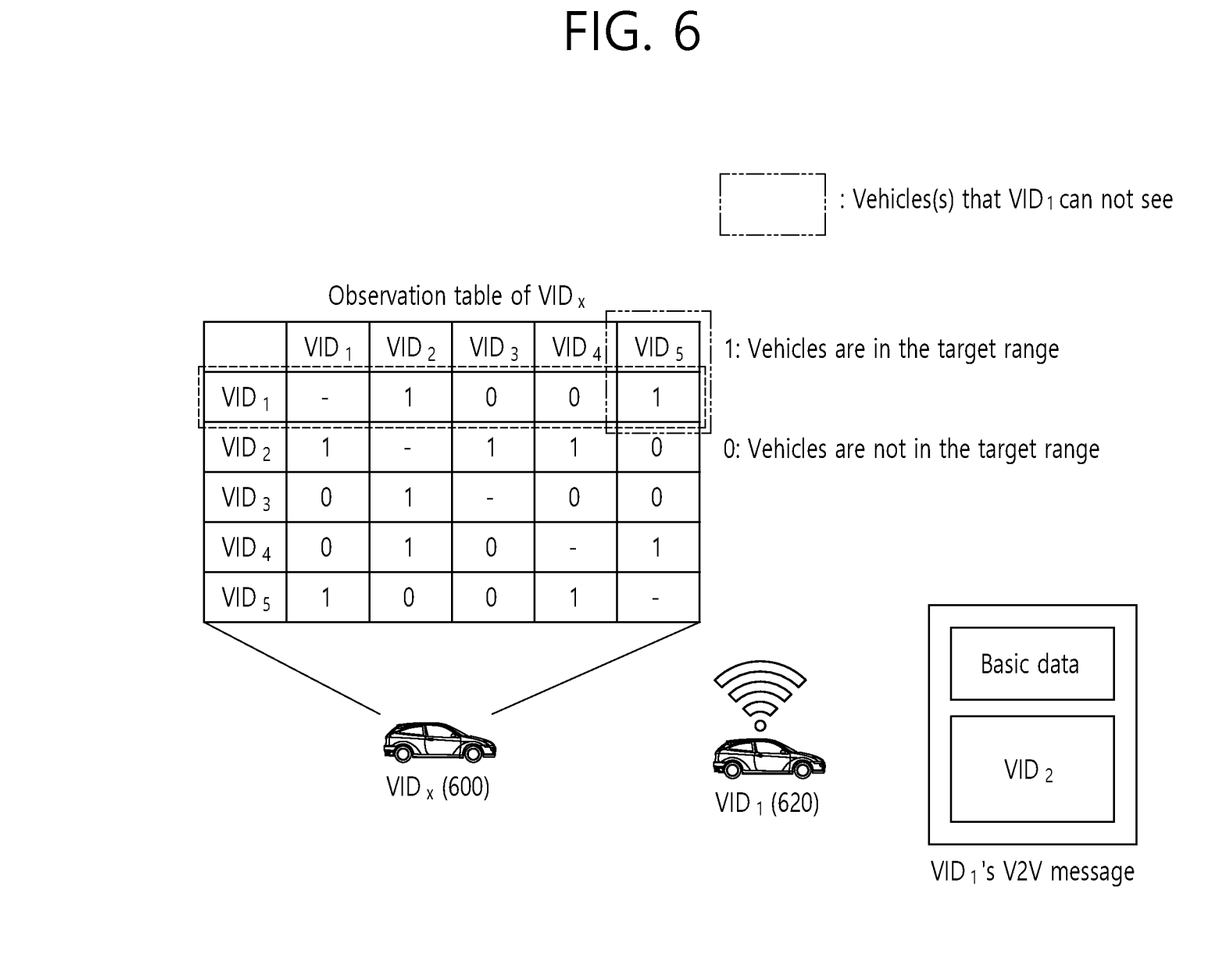
FIG. 6 is a conceptual diagram showing a V2V message relay method according to an embodiment of the present invention.

FIG. 6 is a conceptual diagram showing a V2V message relay method according to an embodiment of the present invention.

A method of relaying a V2V message on the basis of an observation table is disclosed in FIG. 6.

Referring to FIG. 6, a V2V message of an adjacent communication failure vehicle that is within a target range of a vehicle but is not recognized by the vehicle may be relayed on the basis of a created observation table.

For example, a vehicle $VID_X$ (600) may receive a V2V message $VID_1$ from a vehicle $VID_1$ (620) after an observation table as shown in FIG. 5 is created. In this case, it may be assumed that a vehicle within a target range indicated by the V2V message $VID_1$ includes only a vehicle $VID_2$. The vehicle $VID_X$ (600) may know that the vehicle $VID_2$ and a vehicle $VID_5$ are located in the target range of the vehicle $VID_1$ 620 on the basis of the observation table.

Accordingly, the vehicle $VID_X$ 600 may know that the vehicle VID (620) receives a V2V message $VID_2$ from the vehicle $VID_2$ and is aware of the vehicle $VID_2$ but does not receive a V2V message $VID_5$ from the vehicle $VID_5$ and is not aware of the vehicle $VID_5$.

Accordingly, the vehicle $VID_X$ 600 may relay (or deliver) the V2V message $VID_5$ received from the vehicle $VID_5$ to the vehicle $VID_1$. The vehicle $VID_1$ 620 may receive the V2V message $VID_5$ and be aware of the vehicle $VID_5$ located within the target range.

Figure 7:
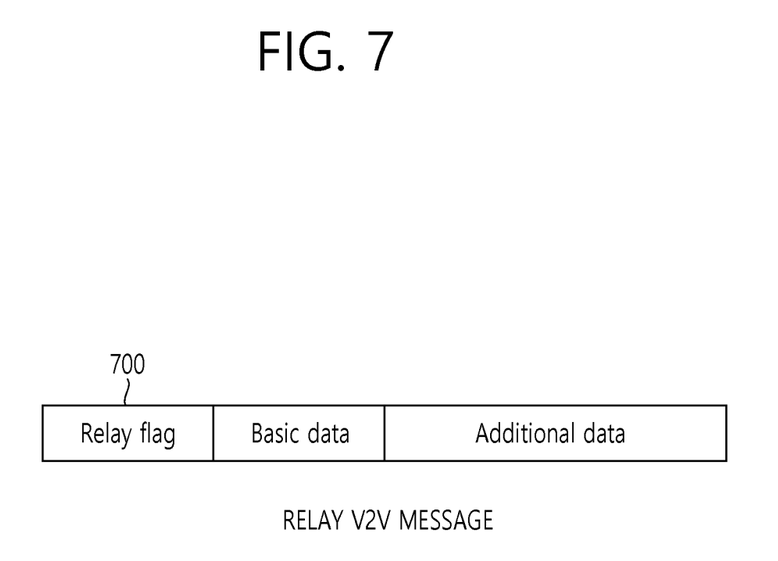
FIG. 7 is a conceptual diagram showing a V2V message relay method according to an embodiment of the present invention.

FIG. 7 is a conceptual diagram showing a V2V message relay method according to an embodiment of the present invention.

A format of a relay V2V message is disclosed in FIG. 7.

Referring to FIG. 7, the relay V2V message may include an additional flag (a relay flat 700) unlike the format of a general V2V message.

A relay vehicle may set the relay flag 700 for indicating a relay V2V message to "1" while transmitting the relay V2V message.

When a plurality of vehicles transmit the relay V2V message on the basis of a created observation table, the relay V2V message may be redundantly transmitted. Accordingly, by adding a relay flag bit of 1 to the relay V2V message, it is possible to prevent different vehicles from repeatedly transmitting the relay message.

For example, when a reception vehicle receives a first relay V2V message from another vehicle before transmitting the first relay V2V message as a relay vehicle, the reception vehicle may not transmit the first relay V2V message.

Also, according to an embodiment of the present invention, when a relay vehicle has to transmit a plurality of relay V2V messages, the relay vehicle may prioritize the relay V2V messages and then preferentially transmit a relay V2V message having a higher priority. For the priorities of the relay V2V messages, a V2V message of an adjacent communication failure vehicle that is not recognized by a relatively large number of adjacent vehicles may have a higher priority.

For example, when the number of vehicles that failed in recognizing a vehicle $VID_1$ within a discovery range is three and the number of vehicles that failed in recognizing a vehicle $VID_3$ within the discovery range is one, the V2V message $VID_1$ of the vehicle $VID_1$ may be set to have a higher priority than the V2V message $VID_3$ of the vehicle $VID_3$ and thus may be preferentially transmitted by the relay vehicle.

Figure 8:
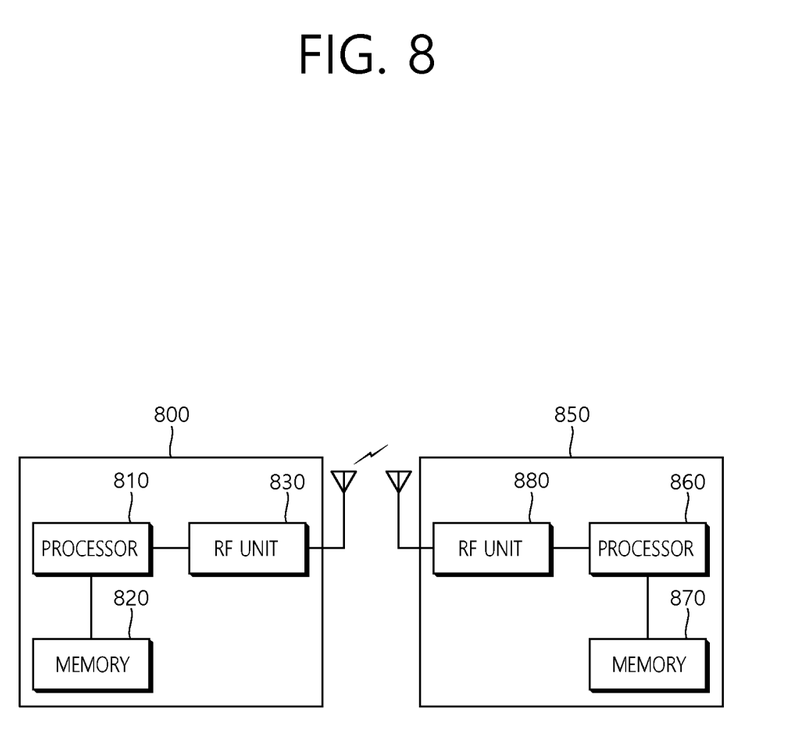
FIG. 8 is a block diagram showing a wireless device according to an embodiment of the present invention.

FIG. 8 is a block diagram showing a wireless device according to an embodiment of the present invention.

Referring to FIG. 8, the wireless device may be a transmitter of a V2V message transmission vehicle (or transmission node) or a receiver of a V2V message reception vehicle (or reception node) wherein the vehicles can implement the above embodiments. A transmitter 800 includes a processor 810, a memory 820, and a radio frequency (RF) unit 830.

The RF unit 830 may be operatively connected to the processor 810 to transmit or receive radio signals.

The processor 810 may implement the functions, processes, and/or methods proposed by the present invention. For example, the processor 810 may perform an operation in which the V2V message transmission vehicles (or transmission nodes) disclosed in the embodiments of FIGS. 1 to 7 transmit V2V messages (or relay V2V messages).

For example, the processor 810 may create a V2V message (Type 1) or a V2V message (Type 2) and transmit the message at predetermined intervals.

The processor 810 may adjust the transmission interval of the V2V message (Type 1) or the V2V message (Type 2). Also, the processor 810 may perform setting for a discovery range for discovering an adjacent vehicle.

A receiver 850 includes a processor 860, a memory 870, and an RF unit 880.

The RF unit 880 may be operatively connected to the processor 860 to transmit or receive radio signals.

The processor 860 may implement the functions, processes, and/or methods proposed by the present invention. For example, the processor 860 may be implemented to perform operations of the V2V message reception vehicles (or reception nodes) according to the aforementioned embodiments of the present invention.

As described above, the processor 860 may receive at least one V2V message from at least one transmission vehicle and discover an adjacent communication failure vehicle for the at least one transmission vehicle on the basis of the at least one V2V message.

Also, the at least one V2V message may be a V2V message (Type 1) or a V2V message (Type 2). The V2V message (Type 1) may include identification information about all discovered adjacent vehicles, and the V2V message (Type 2) may include identification information about a vehicle among the discovered adjacent vehicles that changes.

Also, the V2V message (Type 1) may be transmitted at first intervals, and the V2V message (Type 2) may be transmitted at second intervals. The first interval may be longer than the second interval, and the V2V message (Type 2) may be transmitted at least once within the transmission interval of the V2V message (Type 1).

Also, the relay V2V message may further include a field that is the same as at least one of a plurality of fields included in the at least one V2V message and a relay flag, and the relay flag may be a flag for identifying the relay V2V message.

Also, the processor 860 may be implemented to determine whether to transmit the relay V2V message on the basis of the at least one V2V message and another relay V2V message.

Each of the processors 810 and 860 may include an application-specific integrated circuit (ASIC), other chipsets, a logic circuit, a data processing unit, and/or a converter configured to perform conversion between a baseband signal and a radio signal. Each of the memories 820 and 870 may include a read-only memory (ROM), a random access memory (RAM), a flash memory, a memory card, a storage medium, and/or other storage media.

Each of the RF units 830 and 880 may include one or more antennas for transmitting and/or receiving radio signals.

When an embodiment is implemented in software, the above-described techniques may be implemented by modules (processes, functions, or the like) for performing the above-described functionality. The modules may be stored in the memories 820 and 870 and executed by the processors 810 and 860. The memories 820 and 870 may be located inside or outside the processors 810 and 860 and may be connected to the processors 810 and 860 by various well-known means.

What is claimed is:

1. An inter-vehicle communication method comprising:
   receiving, by a reception node, at least one vehicle-to-vehicle (V2V) message from at least one transmission node; and
   transmitting, by the reception node, a relay V2V message on the basis of the at least one V2V message,
   wherein the at least one V2V message includes information about adjacent vehicles discovered by the at least one transmission node;
   the at least one V2V message is one of a V2V message (Type 1) and a V2V message (Type 2),
   the V2V message (Type 1) includes identification information about all the discovered adjacent vehicles, and
   the V2V message (Type 2) includes identification information about any adjacent vehicles that have newly entered a target range of the at least one vehicle subsequent to and with respect to the V2V message (Type 1), and the V2V message (Type 2) includes identification information about any adjacent vehicles that have left the target range of the at least one vehicle subsequent to and with respect to the V2V message (Type 1).

2. The inter-vehicle communication method of claim 1, wherein,
   the V2V message (Type 1) is transmitted at first intervals,
   the V2V message (Type 2) is transmitted at second intervals,
   the first interval is longer than the second interval, and
   the V2V message (Type 2) is transmitted at least once within the transmission interval of the V2V message (Type 1).

3. The inter-vehicle communication method of claim 2, wherein,
   a relay V2V message includes a field that is the same as at least one of a plurality of fields included in the at least one V2V message and a relay flag, and
   the relay flag is a flag for identifying the relay V2V message.

4. The inter-vehicle communication method of claim 3, wherein the reception node determines whether to transmit the relay V2V message on the basis of the at least one V2V message and another relay V2V message.

5. A reception node for inter-vehicle communication, the reception node comprising:
   a radio frequency (RF) unit configured to communicate with a transmission node; and
   a processor operatively connected to the RF unit,
   wherein,
   the processor is implemented to receive at least one vehicle-to-vehicle (V2V) message from at least one transmission node and transmit a relay V2V message on the basis of the at least one V2V message, and
   the at least one V2V message includes information about adjacent vehicles discovered by the at least one transmission node;
   the at least one V2V message is one of a V2V message (Type 1) and a V2V message (Type 2),
   the V2V message (Type 1) includes identification information about all the discovered adjacent vehicles, and
   the V2V message (Type 2) includes identification information about any adjacent vehicles that have newly entered a target range of the at least one vehicle subsequent to and with respect to the V2V message (Type 1), and the V2V message (Type 2) includes identification information about any adjacent vehicles that have left the target range of the at least one vehicle subsequent to and with respect to the V2V message (Type 1).

6. The reception node of claim 5, wherein,
   the V2V message (Type 1) is transmitted at first intervals,
   the V2V message (Type 2) is transmitted at second intervals,
   the first interval is longer than the second interval, and
   the V2V message (Type 2) is transmitted at least once within the transmission interval of the V2V message (Type 1).

7. The reception node of claim 6, wherein,
   a relay V2V message includes a field that is the same as at least one of a plurality of fields included in the at least one V2V message and a relay flag, and
   the relay flag is a flag for identifying the relay V2V message.

8. The reception node of claim 7, wherein the reception node determines whether to transmit the relay V2V message on the basis of the at least one V2V message and another relay V2V message.

* * * * *